(12) United States Patent
Crisinel et al.

(10) Patent No.: US 6,328,044 B1
(45) Date of Patent: Dec. 11, 2001

(54) PROCESS AND PLANT FOR THE CONTROLLED WASHING OF FOOD PRODUCTS WITH OZONIZED WATER

(75) Inventors: Pascal Crisinel, Guyancourt; Lucie Prost, Paris, both of (FR)

(73) Assignee: L'Air Liquide, Societe Anonyme pour l'Etude et l'Exploitation des Procedes Georges Claude, Paris (FR)

(*) Notice: Subject to any disclaimer, the term of this patent is extended or adjusted under 35 U.S.C. 154(b) by 0 days.

(21) Appl. No.: 09/390,029

(22) Filed: Sep. 3, 1999

(30) Foreign Application Priority Data

Sep. 3, 1998 (FR) .................................................. 98 11039

(51) Int. Cl.⁷ ........................................................ B08B 9/20
(52) U.S. Cl. .................... 134/25.3; 134/25.1; 134/18; 134/39; 134/36; 134/42; 134/99.7; 426/236; 426/312
(58) Field of Search ...................... 426/236, 312; 134/25.1, 25.3, 18, 34, 36, 62, 102.1, 102.2, 99.1

(56) References Cited

U.S. PATENT DOCUMENTS

| 4,849,237 | 7/1989 | Hurst . | |
|---|---|---|---|
| 5,227,184 | * 7/1993 | Hurst | ..................................... 426/312 |
| 5,667,829 | 9/1997 | Herlig . | |

FOREIGN PATENT DOCUMENTS

| 2102362 | 5/1994 | (CA) . |
|---|---|---|
| 02 203739 | 8/1989 | (JP) . |
| 02 145178 | 6/1990 | (JP) . |

* cited by examiner

*Primary Examiner*—Randy Gulakowski
*Assistant Examiner*—Michael Kornakov
(74) *Attorney, Agent, or Firm*—Burns, Doane, Swecker & Mathis, L.L.P.

(57) ABSTRACT

The treatment of a food product is carried out using ozonized water in at least two containers, each container possibly being associated with a set value of the dissolved-ozone content that it is desirable to maintain therein, by ozonizing a stream of water so as to obtain a dissolved-ozone content of the stream of ozonized water greater than or equal to the highest of the set values of the dissolved-ozone content which are associated with each of said containers, and the dissolved-ozone content in each of the solution containers is analyzed in order to compare the result of each of the analyses with the associated set value and to carry out a feedback operation, where appropriate, depending on the result of each comparison, on the control of the flow of ozonized water injected into the container in question, so as to reestablish the dissolved-ozone content of this solution container at its associated set value.

16 Claims, 4 Drawing Sheets

PROCESS AND PLANT FOR THE CONTROLLED WASHING OF FOOD PRODUCTS WITH OZONIZED WATER

BACKGROUND OF THE INVENTION

The present invention relates to a process and a plant for the treatment of food products with ozone, the aim being especially, depending on the case, to bleach, disinfect or deodorize the products thus treated.

It is known that the literature on the ozone treatment of food products, in particular in the field of washing food products (seafood such as fish, crustaceans, but also fruit and vegetables . . . ) with ozonized water is extremely abundant—reference will be made especially to documents FR-385,815, EP-294,502, FR-797,928, CA-2,102,362 or U.S. Pat. No. 4,559,902.

One of the applications which is very promising today is therefore the washing of food products with ozonized water, in particular the washing of fruits and vegetables or seafood.

At the present time, chlorine in its various forms is the main disinfection auxiliary authorized in Europe. The two main forms of chlorine that can be used in such an application are gaseous chlorine, which requires very specific equipment but has, however, the advantage of being 100% active, and, on the other hand, hypochlorites (bleach) which are admittedly simpler to use but which, however, requires [sic] very delicate control of the doses.

The literature usually mentions that this control must be carried out particularly as a function of the quality and the pH of the water (too high a pH reducing the effectiveness of the hypochlorite), making it necessary to control the pH of the water typically between 6.5 and 7. In practice, industrial companies usually control the pH and the chlorine content of their water only locally, which results in the observation that, on the same washing line, chlorine contents can vary over a wide range about the desired content and can thus result in instances of nonconformity in terms of microbiological quality of the final products.

The drawbacks of using chlorine in the washing of food products are well known—they are especially related to the following factors:

the possibilities of water recycling are limited, since extensive recycling results in the formation of chloramines (which chloramines are suspected of having carcinogenic effects and of causing irritations in the eyes and airways) making it preferable to remove the residual chlorine by passing over an active carbon;

chlorine is, moreover, a very stable element which persists for a long time in discharge water;

finally, for user sites employing elemental chlorine, this is transported right to the industrial site in liquid form, which poses considerable safety and storage problems.

It will therefore be understood in this context why both industrial companies and administrations in every country are seeking alternative solutions to chlorine for washing food products and that, among the alternatives available, ozone represents an attractive solution.

This is because:

washing with ozonized water does not require subsequent rinsing of the products (there are no remanant effects of ozone);

any residual ozone which might persist in the water after washing will in fact react very quickly with the organic matter in the collected water—the industrial site will therefore discharge no residues, unlike in the case of chlorine;

the ozone is produced on site, causing no drawback from the standpoint of transportation or storage;

it has been demonstrated that ozonized water is effective over a wider pH range(typically between 6 and 8);

for a plant provided with a cover and with a suitable extraction system for the washing tanks, the content of gaseous ozone in user manufacturing shops is less than the average exposure value (0.1 ppm), thus eliminating the irritation problems due usually to chlorine and chloramines;

the use of ozone allows at least some of the washing water to be recycled.

The studies exhaustively carried out by the Applicant in this field have demonstrated the importance of maintaining a stable concentration of dissolved ozone in the water in the washing tank in order to obtain such disinfection (for example, a set point lying between 1 and 3 ppm depending on the products treated and on the passage time).

It is also necessary to take into consideration the concern that industrial companies usually have about recycling some of their washing water, especially in the case of washing some products such as salad vegetables.

Various solutions have been proposed in the literature for obtaining such a control of the ozone content in the water for washing food products, a first solution consisting in varying the power of the ozonizer.

This solution is certainly conceivable when a single washing line is being equipped, but if several lines are being equipped this solution requires an ozonizer and gas/liquid transfer system for each line.

Another solution envisioned by the literature consists in controlling a flow of ozonized gas (a single ozonizer and a system for controlling the flow of gas injected into the water feeding a given washing tank). Here again, the method proposed is not optimal, knowing that, on the one hand, it is then necessary to install a digital flowmeter for each line, that is to say for each washing tank, but that above all the gas/liquid transfer runs the risk of not being optimized insofar as these transfer systems (a static mixer or else a contacting tower) are designed for a given water flow rate and a given gas flow rate.

These conventional control systems are, for example, described in document CA-2,102,362 in the name of African Oxygen, which describes controlling the ozone content in the product treatment water by measuring the effective content in the water, comparing it with a set point and carrying out a feedback operation, where appropriate, depending on the result of the comparison, on the upstream means for dissolving the ozone.

It should also be noted that the effectiveness of these methods proves to be insufficient if there is a sudden ozone demand (for example, the case of finely shredded raw vegetables for which the exchange surface area is considerably increased) and that they do not take into account the question of water recycling either, since it would be necessary in this case to oversize each ozonizer not only to lower the ozone demand due to the organic matter in the water that is recycled but also to provide the necessary amount of ozone for disinfecting the food products.

The present invention aims to provide a technical solution to the abovementioned problems by making it possible in particular to operate with a single ozonizing unit, whatever the number of washing lines in service, and that the process can locally satisfy any sudden and strong demands for ozone, while still allowing the possibility of recycling at least some of the washings.

The studies exhaustively carried out by the Applicant have demonstrated that it was possible to come up with a technical solution to this combination of problems by producing a flow of overozonized water, that is to say in practice greater than or equal to the highest of the dissolved-ozone content set values associated with the washing tanks of the plant, and to control the dissolved-ozone content in each of the tanks with respect to each set value in question by controlling the flow of overozonized water transported by each feed line of the tanks.

SUMMARY OF THE INVENTION

According to the invention, the plant for the treatment of food products, which includes bringing the product into contact with ozone within an initial solution which contains, apart from the product, ozonized water, therefore comprises:

a) at least two initial solution containers, each container possibly being associated with a set value of the dissolved-ozone content that it is desirable to maintain in the initial solution in question;

b) a source of a treatment gas mixture which contains ozone;

c) a primary source of water;

d) means for ozonizing a stream of water coming from said primary source of water with the aid of the treatment gas mixture, which means are capable of producing, as their output, a stream of ozonized water;

e) means for injecting the stream of ozonized water into each of said initial solution containers;

and is characterized by the combined implementation of the following measures:

the injection means comprise at least two flow-control devices allowing each flow of ozonized water injected into each of said initial solution containers to be controlled;

the dissolved-ozone content of said stream of ozonized water is greater than or equal to the highest of said set values of ozone content which are associated with each of said initial solution containers;

the plant comprises means for analyzing the dissolved-ozone content in each of said initial solution containers as well as data acquisition and processing means capable of receiving the result of the analysis of the dissolved-ozone content in each of the initial solution containers and of comparing with the set value of ozone content associated with each of the containers, in order to carry out a feedback operation, where appropriate, depending on the result of each comparison, on the device for controlling the flow of ozonized water feeding the initial solution container in question so as to reestablish the dissolved-ozone content at the desired set value.

The plant according to the invention may more-over include one or more of the following characteristics:

it includes a buffer tank which is fed with ozonized water coming from said ozonizing means and from which at least two transport lines capable of feeding each of said at least two initial solution containers with ozonized water leave, each transport line being provided downstream of the buffer tank with one of said flow-control devices;

it includes, at least at one of the initial solution containers, a secondary line for feeding the container with make-up water, it being possible for each secondary line to feed the container in question independently or else for it to be connected in its downstream part to the feed/transport line from the initial ozonized-water solution container in question, downstream of the associated control device;

it includes, at least at one of said initial solution containers, means for recirculating water from the container in question toward one or other of the following destinations:
  i) toward this same container in question,
  ii) toward another of said at least two initial solution containers,
  iii) toward a point on a line connecting said primary source of water to the ozonizing means;

said ozonizing means include an ozonizing buffer tank which is fed with water coming from said primary source of water and from which at least two transport lines capable of feeding each of said at least two initial solution containers with ozonized water leave, each transport line being provided downstream of the ozonizing buffer tank with one of said flow-control devices, the ozonizing buffer tank being able to be fed with ozone according to one or other of the following configurations:
  i) the ozonizing buffer tank includes in its internal space a porous diffuser capable of being fed with treatment gas coming from said source of treatment gas;
  j) the ozonizing buffer tank is provided with a closed loop for recirculating the water stored in it back into itself, the loop being provided with a system for dissolving ozone in the water which is recirculated in the loop, which dissolving system is capable of being fed with treatment gas coming from said source of treatment gas;

at least at one of said initial solution containers, the plant comprises means for injecting a make-up gas containing ozone into the initial solution in question.

The invention also relates to a process for the treatment of food products, which includes bringing the product into contact with ozone within an initial solution which contains, apart from the product, ozonized water, according to which:

a) at least two initial solution containers are used, each initial solution container being associated with a set value of the dissolved-oxygen content that it is desirable to maintain in the initial solution in question;

b) a source of a treatment gas mixture which contains ozone is used;

c) a primary source of water is used;

d) means for ozonizing a stream of water coming from said primary source of water are used, these means being capable of producing, as their output, a stream of ozonized water;

(e) a quantity of ozonized water is injected into each of said initial solution containers;

characterized by the combined implementation of the following measures:

said stream of water coming from the primary source of water is ozonized so as to obtain a dissolved-ozone content of the stream of ozonized water greater than or equal to the highest of the set values of dissolved-ozone content which are associated with said initial solution containers;

the flow rate of ozonized water injected into each of said initial solution containers is controlled;

the dissolved-ozone content in each of the initial solution containers is analyzed and the result of each of the analyses is compared with the associated set value, in order to carry out a feedback operation, where appropriate, depending on the result of each comparison, on the control of the flow rate of ozonized water injected into the initial solution container in question so as to reestablish the dissolved-ozone content of the initial solution container in question at its associated set value.

As will be clearly apparent to those skilled in the art, the food products aimed at by the present invention may be extremely varied, comprising, by way of illustration, animal flesh, such as fish pulp, fish fillets or whole fish, but also other seafood, such as molluscs or crustaceans, or else other food products such as fruit and vegetables.

It will also be understood that the ozone "treatment" according to the invention entails, depending on the food product in question but also depending on the specification desired by each particular user site, carrying out one or more actions from the following actions; bleaching, disinfection or deodorization of the product.

Likewise, "initial solution" according to the invention should be understood to mean a homogeneous or nonhomogeneous liquid/solid mixture. It will moreover be understood that, depending on the application in question, the initial solution which therefore comprises the food product and water may furthermore comprise additives such as bases or acids, the function of which may be not only to disinfect but also to adjust the pH of the medium, or else antioxidants, such as ascorbic acid, the list given above absolutely not being exhausted and representative of all the additives commonly used by the food industry.

Moreover, it is known that the plants for the washing of food products conventionally include several washing tanks, the water in at least one of these tanks being chlorinated, for example. According to the present invention, each initial solution container or tank may therefore be the only washing tank of a line or else it may be preceded or followed in the line by one or more tanks for prewashing with water which possibly contains additives—each situation will depend, of course, on the type of product and on the initial state of cleanliness of the products.

As will be clearly apparent to those skilled in the art, the degree of "overozonization" produced by the ozonizing means with respect to the set points to be maintained in the solutions will also be chosen depending on the type and the presentation of the products treated in each solution tank, especially in order to take into account the need to locally satisfy any sudden and strong demands for ozone.

Moreover, the process according to the invention may adopt one or more of the following characteristics:
  at the exit of the ozonizing means, the stream of ozonized water is directed toward a buffer tank from which at least two transport lines intended for feeding each of said at least two initial solution containers with ozonized water leave, each transport line being provided, downstream of the buffer tank, with a flow-control device intended to carry out said control of the flow rate of ozonized water, each line feeding the initial solution containers;
  at least at one of said initial solution containers, a secondary stream of make-up water is added directly into the water in the container in question, or into the stream of ozonized water feeding the initial solution container in question coming from the ozonizing means;
  at least at one of said initial solution containers, water from the container in question is recirculated toward one or other of the following destinations:
    i) toward this same initial solution container in question;
    ii) toward another of said at least two initial solution containers;
    iii) toward the stream of water reaching the ozonizing means, said stream of water coming from the primary source of water;
  in case iii), the recycled water coming from said at least one of said initial solution containers undergoes, before its injection into the stream of water reaching the ozonizing means, a filtration step and, where appropriate, an ozonizing step;
  said stream of water coming from the primary source of water is ozonized, so as to obtain said stream of ozonized water, in the following manner:
    i) an ozonizing buffer tank, which is fed with water coming from said primary source of water and from which at least two transport lines capable of feeding each of said at least two initial solution containers with ozonized water leave, is used, each transport line being provided downstream of the ozonizing buffer tank with a flow-control device capable of carrying out said flow control;
    j) the ozonizing buffer tank includes in its internal space a porous diffuser capable of being fed with treatment gas coming from said source of treatment gas;
  said stream of water coming from the primary source of water is ozonized, so as to obtain said stream of ozonizing water, in the following manner:
    i) an ozonizing buffer tank, which is fed with water coming from said primary source of water and from which at least two transport lines capable of feeding each of said at least two initial solution containers with ozonized water leave, is used, each transport line being provided downstream of the ozonizing buffer tank with a flow-control device capable of carrying out said flow control;
    j) the ozonizing buffer tank is provided with a closed loop for recirculating the water stored in it back into itself and in that ozone is dissolved in the water which is recirculated in the loop, by injecting into it treatment gas coming from said source of treatment gas;
  at least at one of said initial solution containers, a stream of make-up gas containing ozone is injected into the water in the container in question.

BRIEF DESCRIPTION OF THE DRAWINGS

Further characteristics and advantages of the present invention will emerge from the following description given solely by way of illustration and with reference to the appended drawings in which.

DETAILED DESCRIPTION OF THE INVENTION

Figure 1:
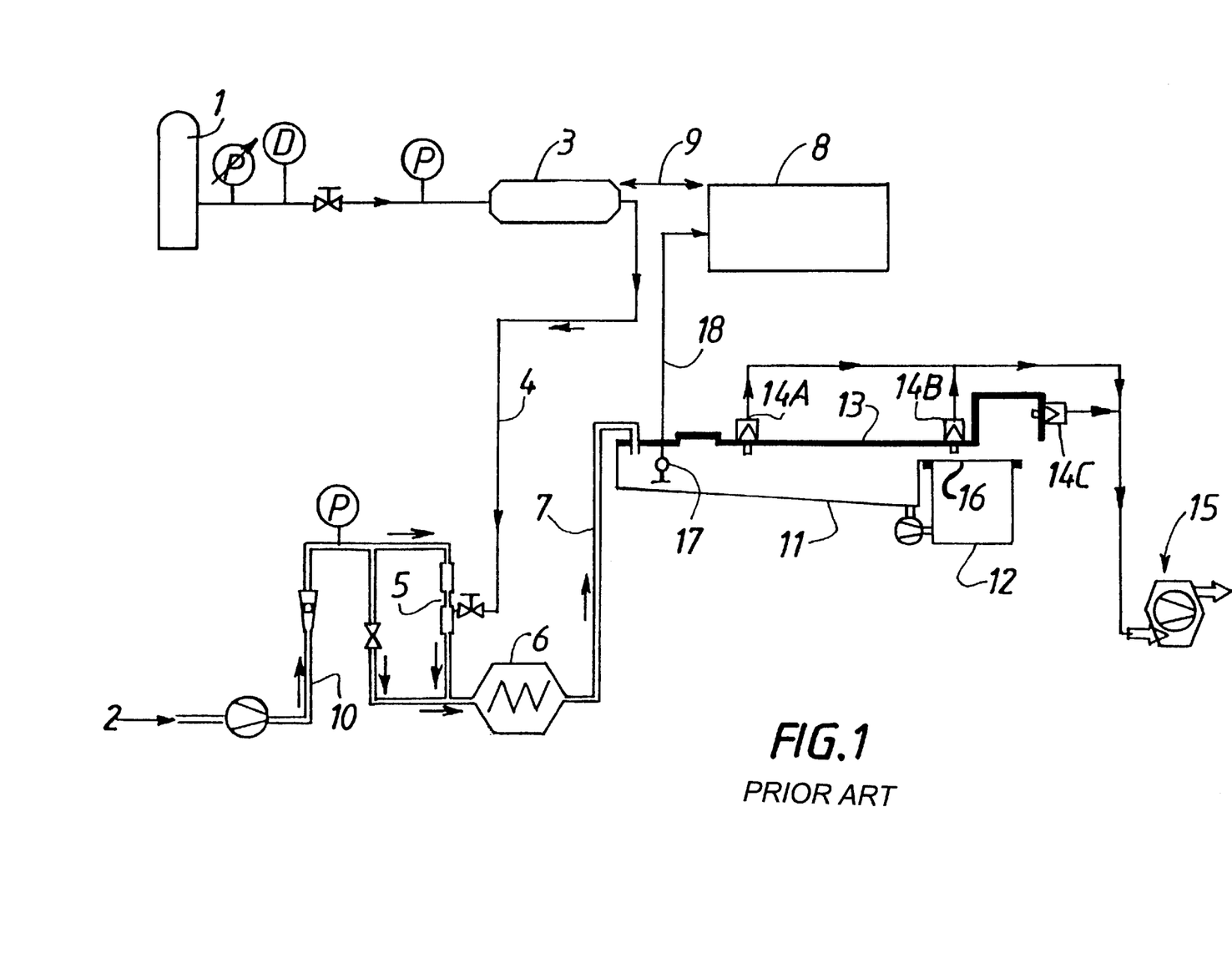
FIG. 1 is a diagrammatic representation of a plant for the washing of food products with ozonized water using a control based on the power of the ozonizer.

FIG. 1 shows the presence of a tank 11 for washing vegetables in ozonized water, followed by a water recycling tank 12, this tank 12 being covered with a mesh 16 above which the products coming from the washing tank 11 can flow and drain.

Since the washing water is ozonized, the assembly consisting of the washing tank 11 and the water recycling tank 12 is covered with a shroud structure 13, shown here in bold lines, to which structure suction systems 14a, 14b and 14c are fastened, said suction systems sending the atmosphere sucked up to an ozone extraction and purification system 15.

In order to feed the tank 11 with ozonized water, this plant therefore uses an ozonizer 3 which is fed with air or with an initial gas mixture containing oxygen coming from a gas source 1, the mixture containing oxygen and the ozone produced by the ozonizer 3 then being sent via the gas line 4 to a water-ozonizing system.

In point of fact, water coming from a primary source 2 of water is sent via the line 10 into a venturi system 5 within which the ozonized gas mixture flowing in the line 4 is injected (gas/liquid transfer system based on a venturi effect well known in the field of ozonization).

The water thus ozonized in the venturi 5 then flows into a contactor 6 (for example, a static mixer or a contacting tower) before joining the washing tank 11 via the line 7. The operation of the washing plant according to the prior art in FIG. 1 is then controlled in the following manner: an analysis 17 of the dissolved-ozone content of the water in the washing tank 11 is made and sent (arrow 18 in the figure) to a programmable controller 8 capable of comparing the result of the measurement thus made with the dissolved-ozone content set point that it is desirable to establish in the tank 11 and to carry out a feedback operation, where appropriate, depending on the result of this comparison, on the power of the ozonizer (arrow 9 in the figure) in order to increase or decrease the ozone content of the gas mixture sent via the line 4 into the stream of water coming from the source 2.

Figure 2:
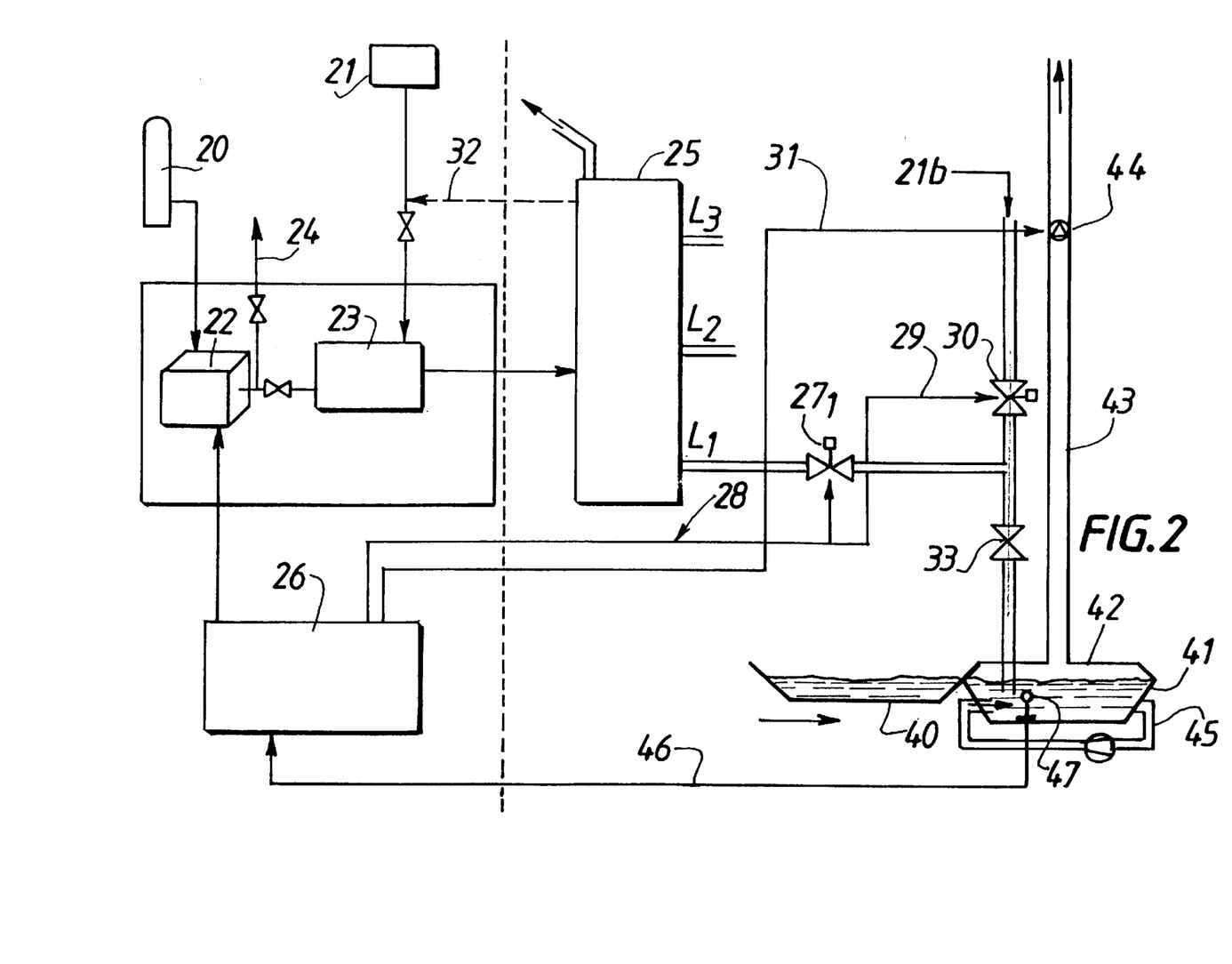
FIG. 2 is a diagrammatic representation of a plant for the washing of food products with ozonized water according to the invention.

With regard to FIG. 2, this shows a plant for the washing of food products with ozonized water according to the invention.

This figure shows the presence of a first tank 40 for washing with simple water, possibly containing additives, for example a suitable acid, followed by a tank 41 for washing with ozonized water, said tank 41 being fed with ozonized water via the valve 33.

As is customary, since this tank is fed with ozonized water, it is covered with a shroud structure 42 fastened to an extraction system 43, 44.

A gas containing oxygen (air, oxygen, etc . . . ) coming from a source 20 is sent into an ozonizer 22 which produces, as its output, a gas mixture containing oxygen and ozone (the ozone content of which may, if required, be analyzed via the analysis tap 24), the gas mixture containing ozone then produced then been sent into ozonizing means 23 which are not shown in detail but are well known to those skilled in the art (venturi effect, static mixer, contacting tower . . . ) in which this treatment gas mixture containing ozone comes into contact with a stream of water coming from a primary source of water 21.

The stream of ozonized water thus formed is then sent into a buffer tank 25 from which at least two transport lines (L1, L2, L3 . . . ), each capable of feeding a washing tank or container with ozonized water coming from the buffer tank 25, leave, FIG. 2 for reasons of clarity only showing one washing tank 41 at the end of line L1.

The line L1 transports the ozonized water coming from the buffer tank 25 into the washing tank 41 via a flow-control device $27_1$, (associated with the line L1) and through a valve 33.

If required, a stream of nonozonized make-up water 21b is added to the stream of ozonized water flowing in the line L1, before this stream reaches the tank 41, said stream of nonozonized make-up water joining the stream of ozonized water via a flow-control device 30.

As already mentioned, there could also be an influx into the tank 41 of a stream of nonozonized make-up water which is independent and separate from the L1/$27_1$/33 line.

The dashed arrow 32 in the figure shows symbolically the possibility of sending a water overflow from the buffer tank 25 back into the line for feeding the ozonizing means 23 with water coming from the source 21, or else of sending water from the buffer tank back into this same line for feeding the ozonizing means for the purpose of "reozonizing" it because the water has remained too long in the tank (ozone relaxation).

As will be clearly apparent to those skilled in the art, the device for controlling the flow flowing in the line L1 may vary extremely in nature, whether this is operated automatically or manually, including solenoid valves, control valves, sequential pumps or metering pumps, or else groups of several on/off valves arranged in parallel.

The plant in FIG. 2 is therefore controlled by the presence of a data acquisition and processing system 26, such as a programmable controller, which receives, from the tank 41, information about the dissolved-oxygen content of the water in this tank 41 (sampling 47 and arrow 46 in the figure) and makes a comparison between this measured content value and the dissolved-ozone content set value associated with this tank 41 in order, where appropriate, depending on this comparison, to carry out a feedback operation via the action line 28 on the flow-control device $27_1$ associated with the tank 41, as well as, where appropriate, on the device 30 for letting a stream of make-up water into the main stream of ozonized water (action line 29).

Figures 3, 4:
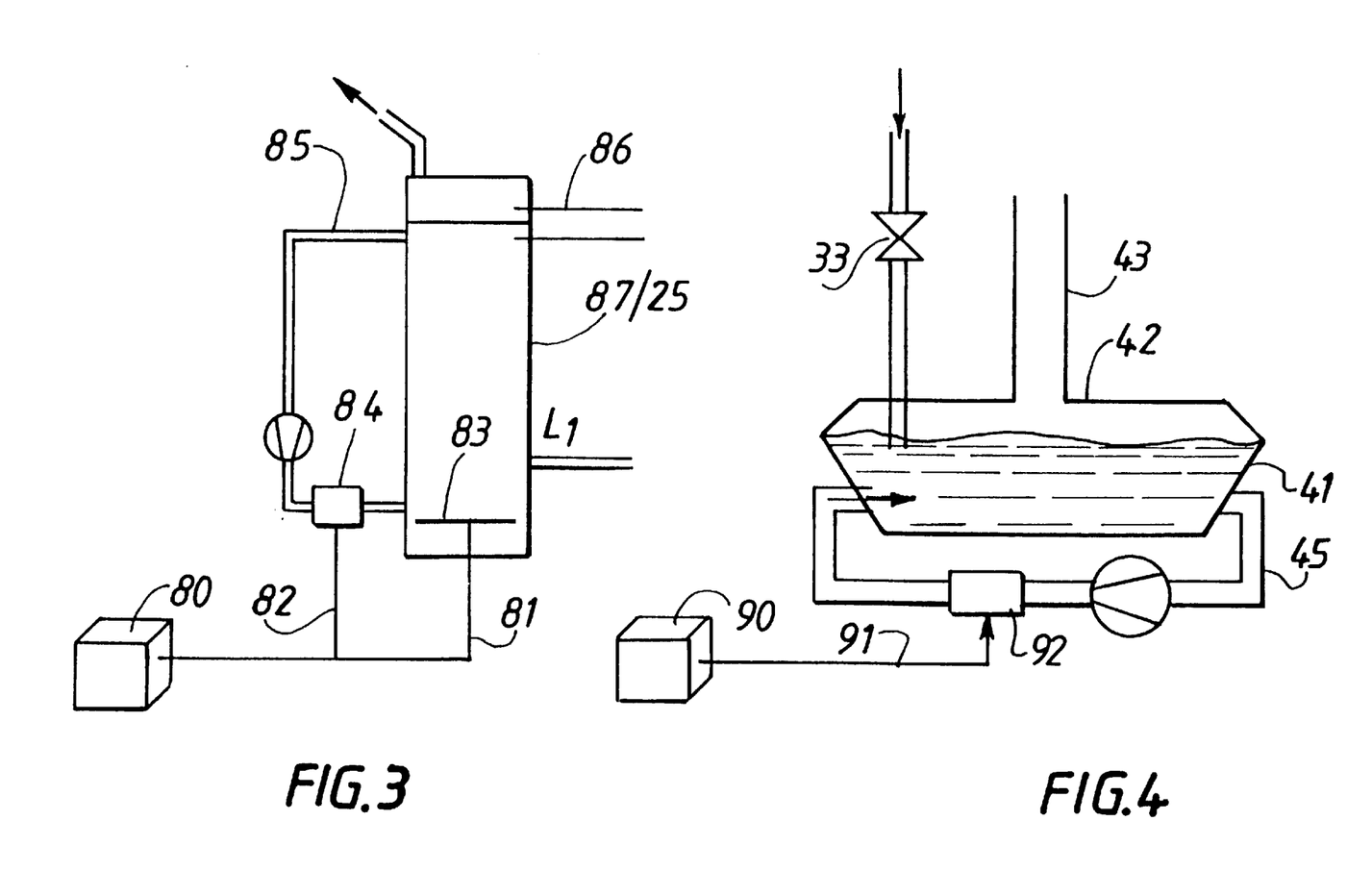
FIG. 3 is a partial view of a plant according to the invention in which a buffer tank is an integral part of the ozonizing means.
FIG. 4 is a partial diagrammatic representation of one embodiment of a plant according to the invention using a secondary injection of ozonized gas into one of the washing tanks.

FIG. 3 illustrates two embodiments of the invention in which the buffer tank 25 (numbered here 87) forms an integral part of the ozonizing means, since a porous diffuser 83 located within the space internal to the buffer tank is connected by means of a line 81 to a source 80 of treatment gas containing ozone, allowing the ozone in the water in the tank to diffuse via a porous member present in the bottom of the tank, the buffer tank 25/87 then providing an additional function of contactor/degasser.

According to the other embodiment shown in FIG. 3, the buffer tank is provided with a closed loop (85) for recirculating the water stored in it back into itself, and ozone is then dissolved (84) in the water which is recirculated in the loop by injecting into it treatment gas coming from the source (80) of treatment gas.

Moreover, it will be noted that the buffer tank is provided here with a water level control 86.

As regards FIG. 4, this illustrates an advantageous embodiment of the invention which is most particularly suitable for the case in which it is necessary to meet a strong background demand for ozone (something which may be the case with certain raw vegetables in finely shredded form), the plant then including, at least at one of the solution containers, a make-up injection of ozonized gas which will be advantageously maintained constant while the control system already described above controls about the set point of the tank 41.

The make-up ozonized gas is injected here into a recirculation loop 45 dedicated to the tank 41, the ozonized gas coming from a source 90 being sent along a line 91, ending in a system 92 for ozonizing the water flowing in the recirculation loop 45 (the system 92 not been shown in detail here, but, as usual, comprising, for example, an injector and a degasser).

Figure 5:
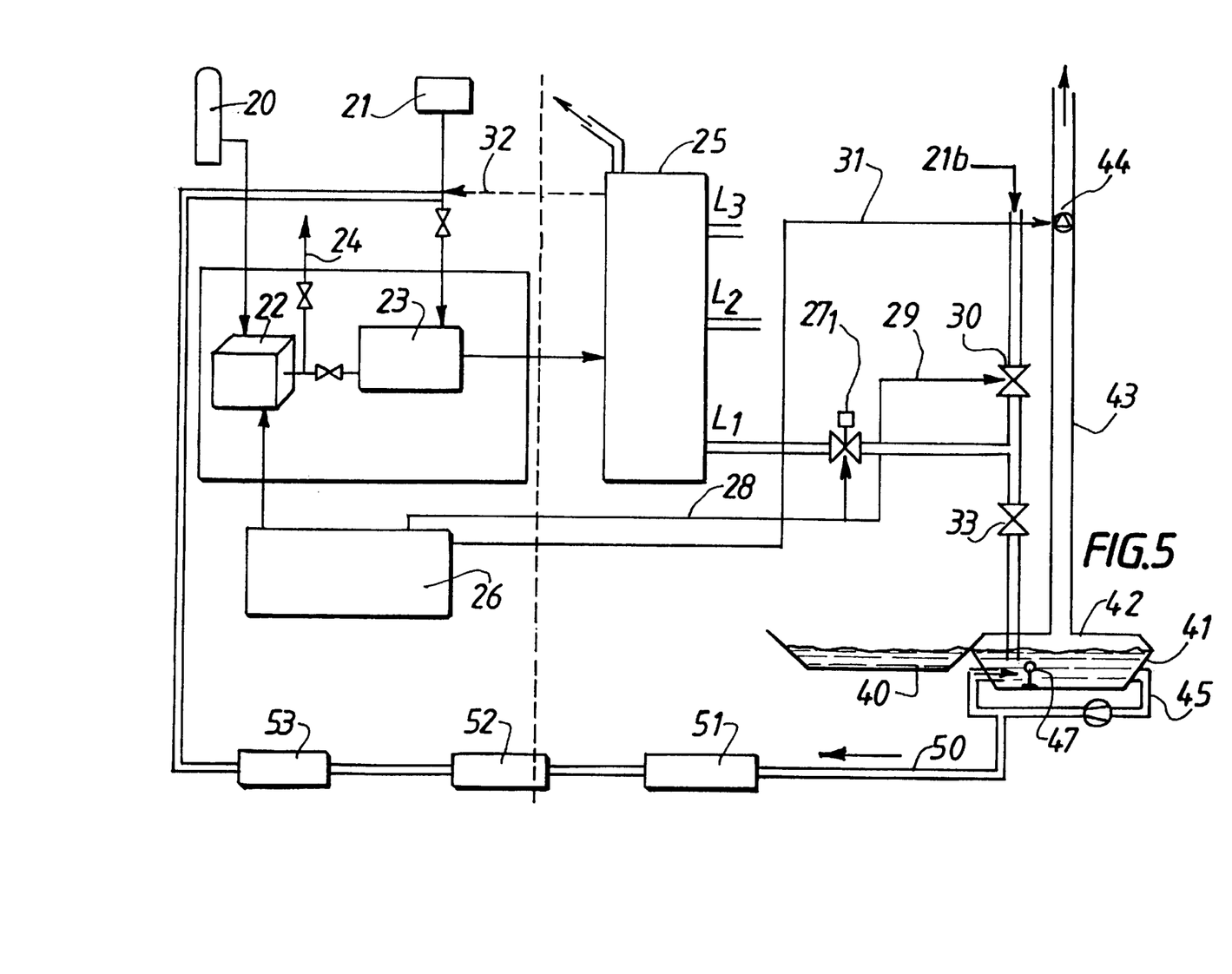
FIG. 5 is a diagrammatic representation of a plant for the washing of food products with ozonized water according to the invention, using, at one of the washing tanks, a control of the water in the tank near a point on the line connecting the primary source of water to the ozonizing means.

The plant in FIG. 5, also according to the invention, differs quite little from the plant described previously in the context of FIG. 2, but includes, at one of the tanks of the plant (in this case here the tank 41), means for recirculating some of the water from the tank along the line 50 in order to recycle this water coming from the tank to a point lying on the line going from the primary source of water 21 to the ozonizing means 23.

Along its path, the water thus recycled is treated again, for example as in the case here, by passing through a filtering system 51, through an ozonizing/disinfecting system 52, followed by a collecting/degassing system (pool) 53 before it is reinjected.

It will therefore be understood, on reading all of the foregoing, that the process and the apparatus according to the invention make it possible to feed ozonized water from a single ozonizing unit into several washing lines in service, by controlling the dissolved-ozone content in each washing tank in a simple and economical manner without at any moment the gas/liquid transfer conditions upstream having to be modified, which is achieved while still being capable of locally satisfying any sudden and strong demands for ozone. The possibility of recycling at least some of the washing water is also preserved.

What is claimed is:

1. Plant for the treatment of food products, which includes bringing the product into contact with ozone within an initial solution which contains, apart from the product, ozonized water, the plant comprising:
   a) at least two containers of initial solution, each container being associated with a set value of the dissolved-ozone content in the initial solution in question;
   b) a source of a treatment gas mixture which contains ozone;
   c) a primary source of water;
   d) means for ozonizing a stream of water coming from said primary source of water with the treatment gas mixture, which means are capable of producing, as their output, a liquid stream of ozonized water;
   e) means for injecting the liquid stream of ozonized water into each of said initial solution containers;
   wherein the injection means comprise at least two flow-control devices for controlling each flow of ozonized water injected into each of said initial solution containers;
   wherein said means for ozonizing a stream of water are capable of providing said liquid stream of ozonized water having a dissolved-ozone content that is greater than or equal to the highest of said set values of ozone content which are associated with said initial solution containers;
   wherein the plant comprises means for analyzing the dissolved-ozone content in each of said initial solution containers as well as data acquisition and processing means capable of receiving the result of the analysis of the dissolved-ozone content in each of the initial solution containers and of comparing with the set value of ozone content associated with each of the containers, wherein the data acquisition and processing means are capable of carrying out a feedback operation by controlling the at least two flow-control devices so as to reestablish the dissolved-ozone content at the desired set value.

2. Plant according to claim 1, further comprising a buffer tank which is capable of being fed with ozonized water coming from said ozonizing means and from which at least two transport lines capable of feeding each of said at least two initial solution containers with ozonized water leave, each transport line being provided downstream of the buffer tank with one of said flow-control devices.

3. Plant according to claim 1, further comprising, at least at one of the initial solution containers, a secondary line for feeding the container in question with make-up water, wherein each secondary line is capable of feeding the container in question independently or else for it to be connected in its downstream part to the feed/transport line from the initial ozonized-water solution container in question, downstream of the associated control device.

4. Plant according to claim 1, further comprising at least at one of said initial solution containers, means for recirculating water from the container in question toward one or other of the following destinations:
   i) toward the same container in question,
   ii) toward another of said at least two initial solution containers,
   iii) toward a point on a line connecting said primary source of water to the ozonizing means.

5. Plant according to claim 4, wherein in case iii) of recirculation toward a point on a line connecting the primary source of water to the ozonizing means, the plant comprises filtration means and an optional ozonizing means, wherein said filtration means and optionally said ozonizing means are capable of treating the recycled water coming from said initial solution container before its arrival at said point on the line connecting the primary source of water to the ozonizing means.

6. Plant according to claim 1, wherein said ozonizing means include an ozonizing buffer tank which is fed with water coming from said primary source of water and from which at least two transport lines capable of feeding each of said at least two initial solution containers with ozonized water leave, each transport line being provided downstream of the buffer tank with one of said flow-control devices, the ozonizing buffer tank being able to be fed with ozone according to one or other of the following configurations:
   the ozonizing buffer tank includes in its internal space a porous diffuser capable of being fed with treatment gas coming from said source of treatment gas;
   the ozonizing buffer tank is provided with a closed loop for recirculating the water stored in it back into itself, the loop being provided with a system for dissolving ozone in the water which is recirculated in the loop, said dissolving system capable of being fed with treatment gas coming from said source of treatment gas.

7. Plant according to claim 2 wherein said ozonizing means include said buffer tank which is capable of being fed with water coming from said primary source of water and with ozone according to one or other of the following configurations:
   the buffer tank includes in its internal space a porous diffuser capable of being fed with treatment gas coming from said source of treatment gas;

the buffer tank is provided with a closed loop for recirculating the water stored in it back into itself, the loop being provided with a system for dissolving ozone in the water which is recirculated in the loop, which dissolving system is capable of being fed with treatment gas coming from said source of treatment gas.

8. Plant according to claim 1, wherein at least at one of said initial solution containers, the plant comprises means for injecting a make-up gas containing ozone into the initial solution in question.

9. Process for the treatment of a food product, comprising bringing the product into contact with ozone within an initial solution which contains, apart from the product, ozonized water;

providing at least two initial solution containers, each initial solution container being associated with a set value of the dissolved-ozone content that it is desirable to maintain in the initial solution in question;

providing a source of a treatment gas mixture which contains ozone;

providing a primary source of water;

providing means for ozonizing a stream of water coming from said primary source of water, wherein said means are capable of producing, as their output, a liquid stream of ozonized water;

injecting a quantity of the liquid stream of ozonized water into each of said initial solution containers;

wherein said stream of water coming from the primary source of water is ozonized so as to obtain a dissolved-ozone content of the liquid stream of ozonized water that is greater than or equal to the highest of the set values of dissolved-ozone content which are associated with said initial solution containers;

wherein the flow rate of ozonized water injected into each of said initial solution containers is controlled;

wherein the dissolved-ozone content in each of the initial solution containers is analyzed and the result of these analyses is compared with the set value associated with each container, in order to carry out feedback operation, depending on the result of each comparison, wherein the feedback operation comprises controlling the flow rate of ozonized water injected into the initial solution container in question so as to reestablish the dissolved-ozone content of the initial solution container in question at its associated set value.

10. Process according to claim 9, wherein at the exit of the ozonizing means, the stream of ozonized water is directed toward a buffer tank from which at least two transport lines intended for feeding each of said at least two initial solution containers with ozonized water leave, each transport line being provided, downstream of the buffer tank, with a flow-control device intended to carry out said control of the flow rate of ozonized water, each line feeding the initial solution containers.

11. Process according to claim 9, wherein at least at one of said initial solution containers, a secondary stream of make-up water is added directly into the water in the container in question, or into the stream of ozonized water feeding the initial solution container in question coming from the ozonizing means.

12. Process according to claim 9, wherein at least at one of said initial solution containers, water from the container in question is recirculated toward one or other of the following destinations;

i) toward the same initial solution container in question;

ii) toward another of said at least two initial solution containers;

iii) toward the stream of water reaching the ozonizing means, said stream of water coming from the primary source of water.

13. Process according to claim 12, wherein, in case iii), the process further comprises filtering and optionally ozonizing the recycled water coming from at least one of said initial solution containers before the recycled water is injected into the stream of water reaching the ozonizing means.

14. Process according to claim 9, wherein said stream of water coming from the primary source of water is ozonized, so as to obtain said stream of ozonized water, in the following manner:

an ozonizing buffer tank which is fed with water coming from said primary source of water and from which at least two transport lines capable of feeding each of said at least two initial solution containers with ozonized water leave, is used, each transport line being provided downstream of the ozonizing buffer tank with a flow-control device capable of carrying out said flow control;

the ozonizing buffer tank includes in its internal space a porous diffuser capable of being fed with treatment gas coming from said source of treatment gas.

15. Process according to claim 9, wherein said stream of water coming from the primary source of water is ozonized, so as to obtain said stream of ozonizing water, in the following manner:

an ozonizing buffer tank which is fed with water coming from said primary source of water and from which at least two transport lines (L1, L2 . . . ) capable of feeding each of said at least two initial solution containers with ozonized water leave, is used, each transport line being provided downstream of the ozonizing buffer tank with a flow-control device capable of carrying out said flow control;

the ozonizing buffer tank is provided with a closed loop for recirculating the water stored in it back into itself and in that ozone is dissolved in the water which is recirculated in the loop, by injecting into it treatment gas coming from said source of treatment gas.

16. Process according to claim 9, wherein at least at one of said initial solution containers, a stream of make-up gas containing ozone is injected into the water in the container in question.

* * * * *